(12) United States Patent
Hildebrand et al.

(10) Patent No.: US 7,305,932 B2
(45) Date of Patent: Dec. 11, 2007

(54) POINTER INSTRUMENT WITH A DOUBLE POINTER

(75) Inventors: Bernd Hildebrand, Maintal (DE); Bernd Uerdingen, Rodgau (DE)

(73) Assignee: Siemens Aktiengesellschaft, Munich (DE)

( * ) Notice: Subject to any disclaimer, the term of this patent is extended or adjusted under 35 U.S.C. 154(b) by 50 days.

(21) Appl. No.: 10/761,523

(22) Filed: Jan. 21, 2004

(65) Prior Publication Data

US 2004/0173025 A1 Sep. 9, 2004

(30) Foreign Application Priority Data

Jan. 22, 2003 (DE) ................. 103 02 386

(51) Int. Cl.
*G01D 13/22* (2006.01)
(52) U.S. Cl. .................. 116/301; 116/288; 116/DIG. 6
(58) Field of Classification Search ................ 116/288, 116/62.1, 286, 287, 300, 301, 284, 293, DIG. 6
See application file for complete search history.

(56) References Cited

U.S. PATENT DOCUMENTS

| | | | | | |
|---|---|---|---|---|---|
| 925,814 | A | * | 6/1909 | Jones ........................ | 116/293 |
| 1,368,941 | A | * | 2/1921 | Klein ................... | 116/DIG. 6 |
| 2,577,491 | A | * | 12/1951 | Teter ......................... | 116/293 |
| 2,717,573 | A | * | 9/1955 | Murray ...................... | 116/301 |
| 2,882,855 | A | * | 4/1959 | Anderson .................. | 116/301 |
| 3,091,214 | A | * | 5/1963 | Hoffman .................... | 116/287 |
| 4,151,651 | A | * | 5/1979 | Szymber .................... | 116/300 |
| 4,324,197 | A | * | 4/1982 | Parfitt ........................ | 116/300 |
| 4,561,042 | A | * | 12/1985 | Wehner et al. .............. | 116/286 |
| 5,529,014 | A | * | 6/1996 | Ohta et al. .................. | 116/286 |
| 5,603,283 | A | * | 2/1997 | Owen ......................... | 116/284 |
| 6,178,917 | B1 | | 1/2001 | Jansa | |
| 6,216,630 | B1 | * | 4/2001 | Ogawa et al. ............. | 116/284 |
| 6,557,485 | B1 | | 5/2003 | Sauter | |
| 2002/0108555 | A1 | | 8/2002 | Breinich et al. | |

FOREIGN PATENT DOCUMENTS

| | | |
|---|---|---|
| DE | 39 06 721 A1 | 9/1990 |
| DE | 43 18 554 A1 | 12/1994 |
| DE | 196 01 270 A1 | 7/1997 |
| DE | 297 15 340 U1 | 3/1998 |
| DE | 197 37 679 A1 | 3/1999 |
| DE | 197 43 784 A1 | 4/1999 |
| DE | 198 28 041 A1 | 1/2000 |
| DE | 199 27 462 A1 | 12/2000 |
| DE | 100 26 860 A1 | 12/2001 |

\* cited by examiner

*Primary Examiner*—Richard Smith
*Assistant Examiner*—Travis Reis
(74) *Attorney, Agent, or Firm*—Cohen Pontani Lieberman & Pavane LLP

(57) ABSTRACT

A pointer instrument has two instrument mechanisms arranged independently of one another on a printed circuit board such that the printed circuit board in between the two instrument mechanisms. Each of the instrument mechanisms act on an associated pointer. To minimize the height between the instrument mechanism and the pointer, the printed circuit board is arranged between the two instrument mechanisms and the rotation axes of the two instrument mechanisms are arranged so that they are essentially concentric with respect to one another. The drive to the pointer from the lower one of the instrument mechanisms is provided by a bracket or through the printed circuit board and a hollow shaft for the upper instrument mechanism.

7 Claims, 3 Drawing Sheets

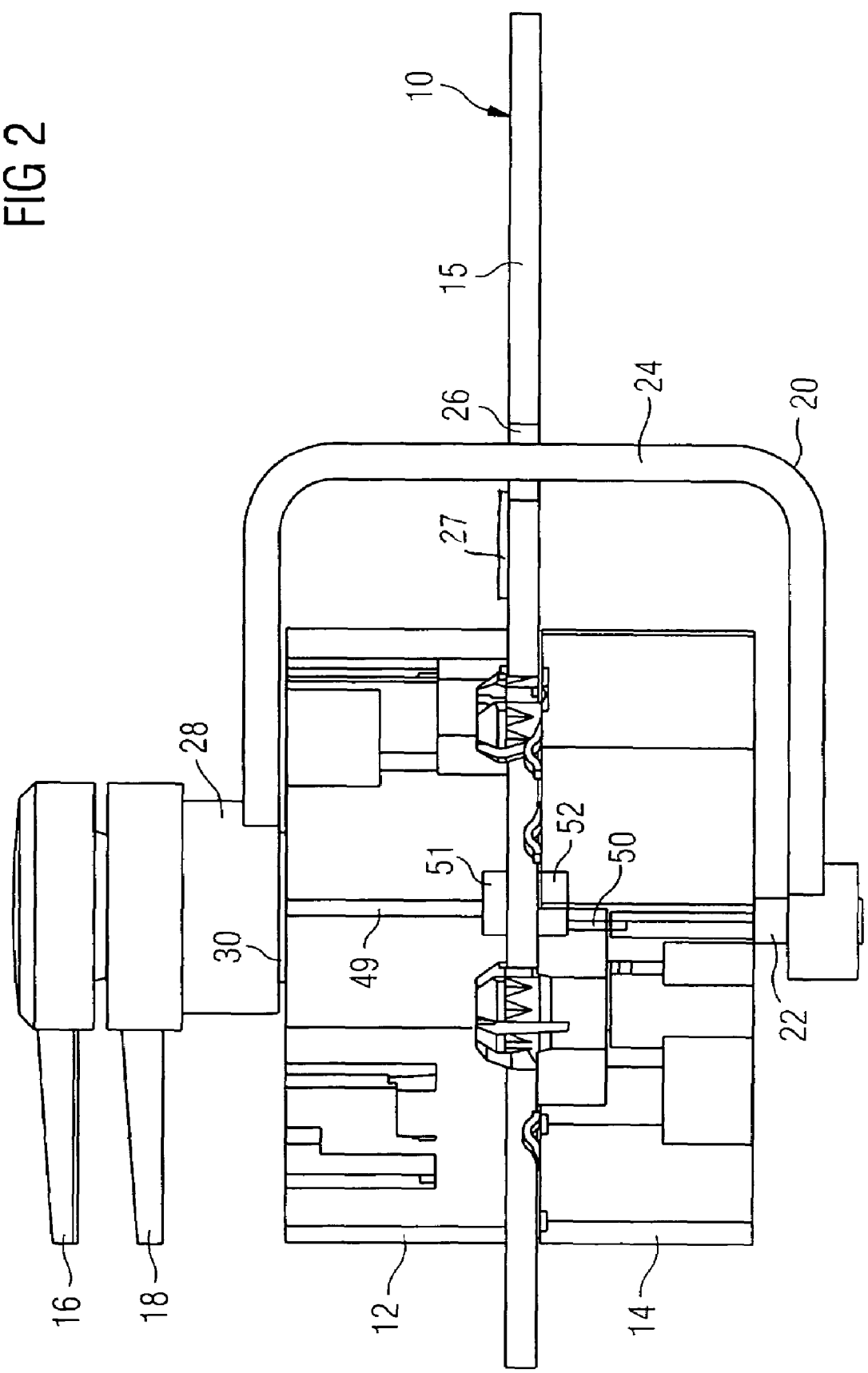

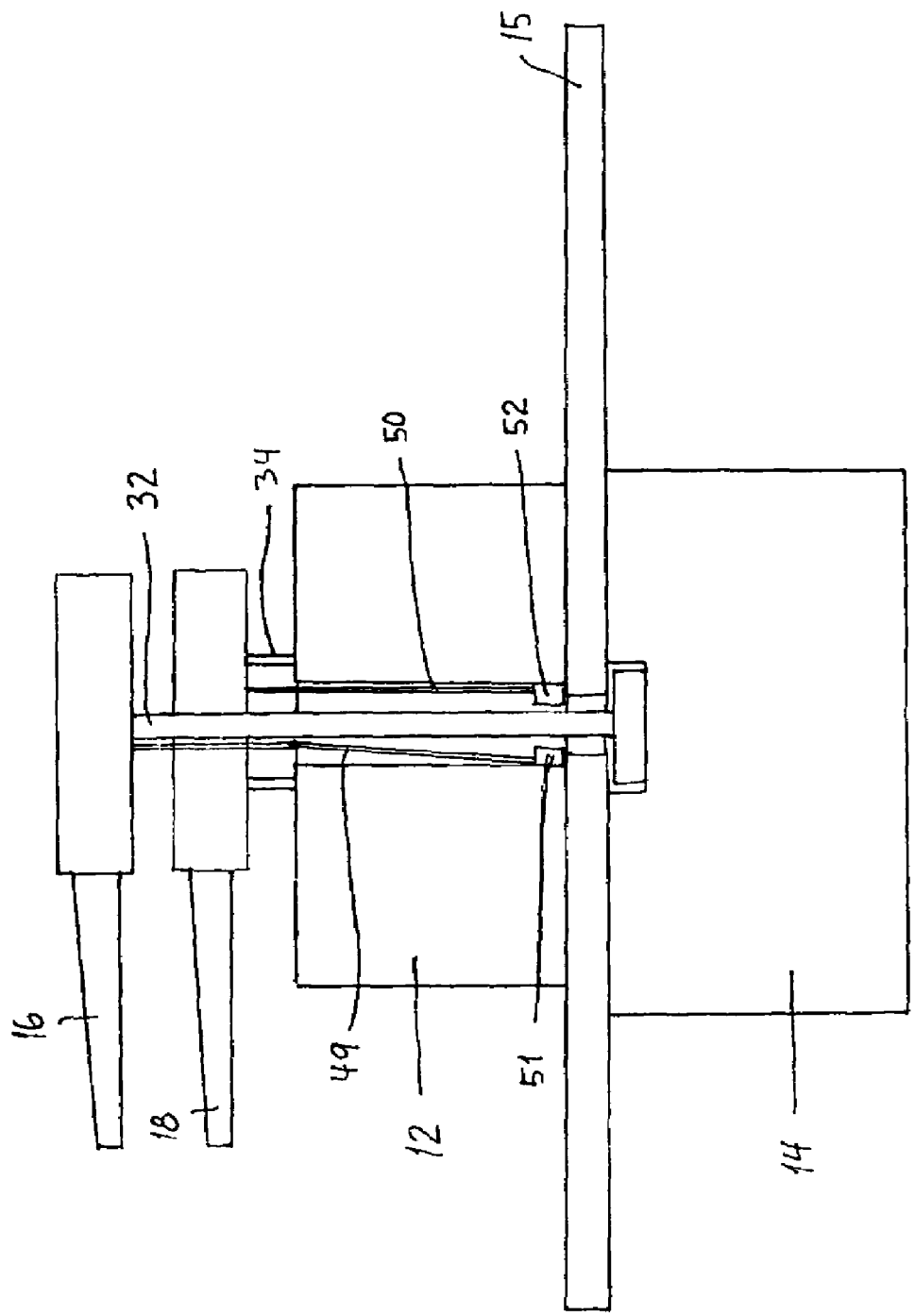

POINTER INSTRUMENT WITH A DOUBLE POINTER

BACKGROUND OF THE INVENTION

1. Field of the Invention

The invention relates to a pointer instrument having two instrument mechanisms which are arranged independently of one another on a printed circuit board, each of the pointer instruments acting on a respective one of two pointers, and the two pointers having essentially concentric pivoting axes.

2. Description of the Prior Art

To allow an instrument panel to simultaneously inform an operator of two or more operating states of a motor vehicle such as, by way of example, speed of the motor vehicle, engine speed, oil pressure, oil temperature, water temperature, vehicle power supply system voltage, and fuel tank contents, a large number of pointer instruments are required which use a very large amount of space. Furthermore, the use of a large number of multiple pointer instruments may restrict clarity if the instruments are arranged alongside one another. Pointer instruments with double pointers are therefore already known, for example from DE 39 06 721 A1 or U.S. Pat. No. 6,178,917, in which instrument mechanisms which operate independently of one another act on pointers which are arranged concentrically with respect to one another. In the known embodiments, the instrument mechanisms which act on the pointers are arranged alongside one another on a printed circuit board. This arrangement requires that a specific transmission must be provided at least between an instrument mechanism and its associated pointer to transmit the actuating movement. This additional transmission includes a wheel mechanism and considerably increases the distance between the dial plane and the printed circuit board relative to the normal distance in pointer instruments with only one pointer. If an arrangement at the same height level or virtually at the same height level is desirable in an instrument panel, each of the corresponding instrument mechanisms must be located with a separate rigid printed circuit board, which is arranged on a plane which is located parallel and at the rear of the main printed circuit board. This arrangement adds further complexity to the already complex design which increases the manufacturing costs of the instrument panel and/or restricts the design freedom.

SUMMARY OF THE INVENTION

The object of the present invention is to provide a pointer instrument having a double pointer and which has a small physical height between the printed circuit board and the pointer plane.

The object of the invention is met by a pointer instrument having two instrument mechanisms which are arranged independently of one another on a printed circuit board, each of the pointer instruments acting on a respective one of two pointers, and the two pointers having essentially concentric pivoting axes, wherein the printed circuit board is arranged between the two instrument mechanisms. The arrangement of the two instrument mechanisms on the two sides of the printed circuit board with rotation axes which are located concentrically with respect to one another obviates the requirement for a transmission stage to compensate for the offset between the rotation axes, as was essential in previously known pointer instruments. In consequence, the dial plane in the instrument according to the present invention may also be arranged at a level with respect to the printed circuit board as is normal for pointer instruments with only one instrument mechanism, and which is normally likewise seated on the upper face of the printed circuit board.

According to a first embodiment of the present invention, the instrument mechanism arranged below the printed circuit board with respect to the pointers may be connected to its associated pointer by a shaft which passes through the printed circuit board and through a hollow shaft which connects the instrument mechanism which is arranged above the printed circuit board to the pointer which is associated with it. In this embodiment, a hollow shaft is used instead of the solid-material shafts conventionally used, at least for the instrument mechanism which is located above the printed circuit board. This solution is particularly space-saving and requires only a certain physical height below the printed circuit board, while no additional physical space is required in the radial direction with respect to the pivoting axes of the pointers, in comparison to a pointer instrument with only one pointer.

In this embodiment, in which a shaft runs through a hollow shaft, an optical fiber is preferably provided between the hollow shaft and the shaft which runs through it, to illuminate the pointer of the lower instrument mechanism. For this purpose, the hollow shaft may be designed to be appropriately larger to create sufficient space for the optical fiber.

In an alternative embodiment of the present invention, the instrument mechanism which is arranged under the printed circuit board with respect to the pointers may be connected to the pointer which is associated with it by a bracket which projects through a cutout in the printed circuit board and possibly through an optical fiber, an optical fiber layer, or light guide. The cutout is in the form of an arc and is located concentrically with respect to the pointer pivoting axis. This embodiment also obviates the requirement for a transmission. In contrast to the previously-described embodiment, the pointer deflection in this embodiment is restricted by the length of the cutout which is in the form of an arc. A cutout with an arc of about 90° has been found to be expedient to avoid unnecessarily exacerbating the arrangement of the conductor tracks on the printed circuit board and also avoids disadvantageously influencing the effect of light guidance.

In one embodiment of the invention, the area of the bracket which points radially inward with respect to the pivoting axis of the pointers and is above the printed circuit board itself directly may form the pointer. In an embodiment such as this, a cutout which is in the form of an arc may be provided in the dial for that part of the bracket which runs essentially parallel to the pivoting axis. Alternatively, the area of the bracket which acts as a pointer may be visible through a cutout, which is preferably in the form of an arc, in the dial. In this case, the dial may be arranged exactly at the same distance from the printed circuit board as in the case of a pointer instrument with one pointer.

The bracket may alternatively be connected to the pointer associated with it by a hollow shaft element, through which the shaft of the pointer of the instrument mechanism which is located above the printed circuit board passes. In this arrangement, the minimum possible distance between the dial and the printed circuit board is increased somewhat in comparison to a pointer instrument with only one pointer. However, the height of the bracket may be chosen to be very small and correspondingly occupy much less height than the wheel mechanism of a transmission. An optical fiber is preferably provided on the bracket element or the bracket is itself in the form of a light guide element for illuminating the pointer which is driven by the bracket. This is also advantageous in the case of a pointer which is itself formed by the bracket.

The present invention also relates to an instrument panel having a printed circuit board on which two or more pointer instruments are arranged having pointer pivoting axes which are essentially parallel to one another. According to the present invention, at least one of the pointer instruments in the instrument panel is designed corresponding to the previously described pointer instrument, thus allowing a continuous dial plane. The instrument mechanisms of the pointer instruments with only one pointer are preferably arranged above the printed circuit board so that instrument mechanisms may be arranged on the lower face of the printed circuit board only in pointer instruments having double pointers.

A combined indication may be provided by the present invention such that direct association of measurement values or state information, and limit values or nominal values which are related to them, is allowed with one pointer indicating the measurement value and the other pointer, which rotates coaxially with respect to it, indicating the limit value or nominal value, such as, for example, for specific driving states. This type of indication is particularly worthwhile for adaptive cruise control, engine speed measurement with a nominal value preset, or for an engine speed nominal value preset which is dependent on the engine temperature.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 2 is a sectional view of the pointer instrument along the pivoting axis in FIG. 1; and FIG. 3 is a sectional view of another embodiment of the present invention.

DETAILED DESCRIPTION OF THE PREFERRED EMBODIMENTS

Figure 1:
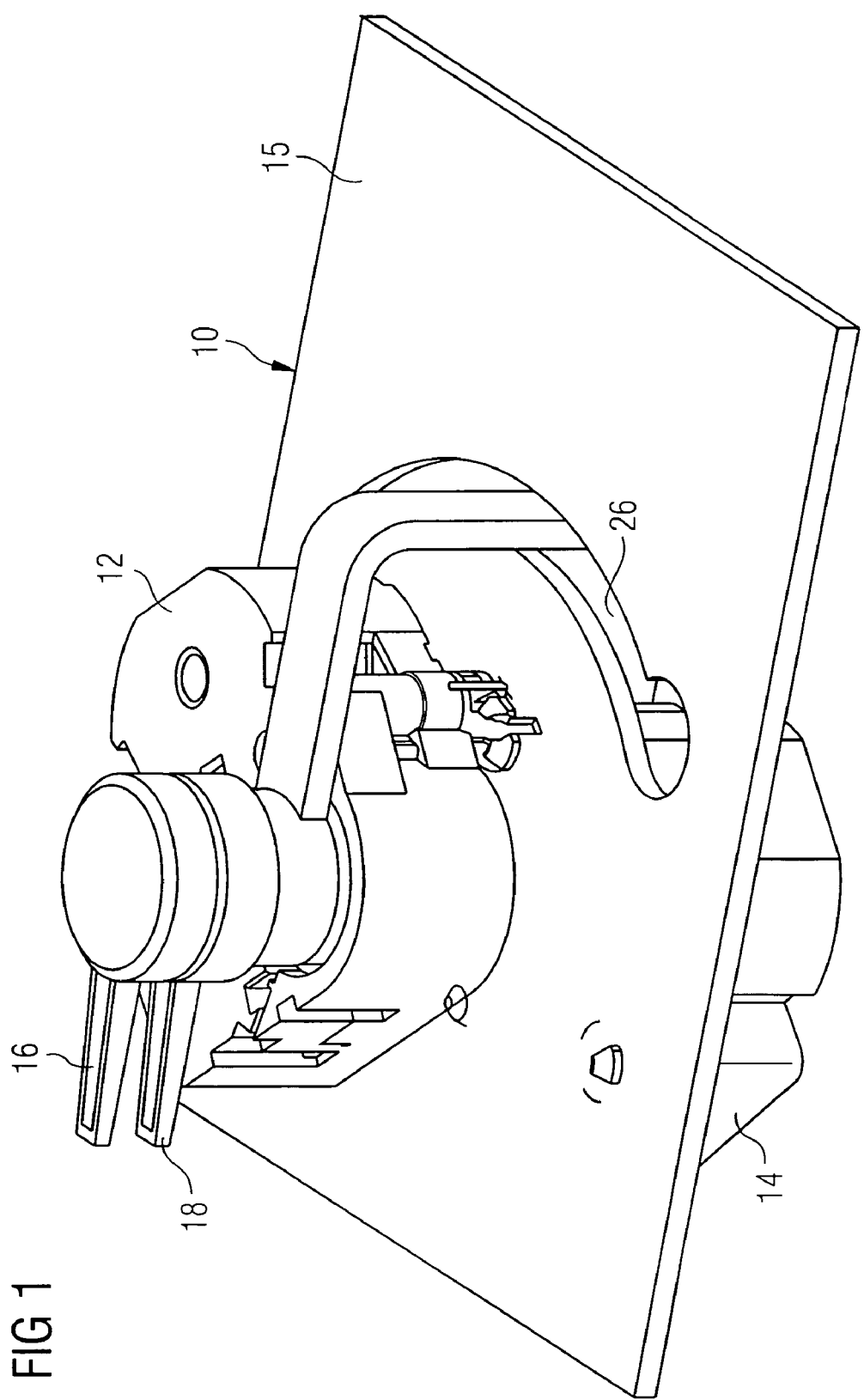
FIG. 1 is a perspective view of a pointer instrument with a double pointer according to an embodiment of the present invention.

FIG. 1 shows a pointer instrument 10 including first and second instrument mechanisms 12, 14 arranged on a printed circuit board 15. Conductor tracks (not shown) on the printed circuit board 15 provide the electrical drive for the first and second instrument mechanisms 12, 14 and transmit this to other instrument mechanisms. The first instrument mechanism 12 is arranged on the upper face of the printed circuit board 15 with respect to the dial (not shown), while the second instrument mechanism 14 is arranged under the printed circuit board 15. The rotation axes of the first and second instrument mechanisms 12, 14 are concentrically aligned with respect to one another.

The first and second instrument mechanisms 12, 14 are respectively associated with first and second pointers 16, 18. The first and second pointers 16, 18 can be moved completely independently of one another by the respectively associated one of the first and second instrument mechanisms 12, 14 about pivoting axes which are concentric with respect to one another.

The drive for the second pointer 18 which is associated with the second instrument mechanism 14 arranged under the printed circuit board 15 includes an essentially U-shaped bracket 20 which is connected in a rotationally fixed manner to a drive shaft 22 for the second instrument mechanism 14 (see FIG. 2). A first portion of the bracket 20 extends from the drive shaft 22 initially parallel to the printed circuit board 15 and as far as the instrument mechanism 14, where the first portion is connected to a section 24 of the bracket 20 which runs perpendicular to the printed circuit board 15 and is passed through a cutout 26 in the printed circuit board. Above the first instrument mechanism 12, the U-shaped bracket 20 is once again bent parallel to the printed circuit board, in the direction of the rotation axis. An annular holder 28 is concentric about the pivoting axis and is fitted to the second pointer 18. The holder 28 is seated at the end of the U-shaped bracket 20. The cutout 26 in the printed circuit board 15 is in the form of an elongated hole that is arranged concentrically about the pivoting axis (see FIG. 1).

The first instrument mechanism 12 arranged above the printed circuit board 15 has a drive shaft 30 which is lengthened by the annular holder 28 of the second pointer 18. The first pointer 16 is fitted in a rotationally rigid manner above the pointer 18 to an end of the drive shaft. In this embodiment, the dial is expediently arranged on a plane parallel to the printed circuit board 15 and between the U-shaped bracket 20 and the pointer 18. The distance between the dial and the printed circuit board 15 may in this case essentially correspond to the distance in a pointer instrument with only one pointer since only a minimal amount of space is provided for the bracket between the dial and the first instrument mechanism 12.

The printed circuit board 15 may also be provided with an optical fiber 27 or with a light guide, which is likewise cut out in the area of the cutout 26. The light may be injected into the second pointer 18 through the bracket 20, while light can be injected into the first pointer 16 and/or the second pointer 18 through the drive shaft 30.

The pointer 18 may be omitted, in which case that section of the U-shaped bracket 20 which runs parallel to the printed circuit board 15 may itself act as a pointer. In this configuration, the dial is arranged underneath this section of the U-shaped bracket 20, with a corresponding cutout being provided for the vertical section 24 to pass through. In an alternative arrangement, the dial may be arranged above the parallel section of the bracket 20 and a transparent cutout may be provided in the dial to make at least a part of the bracket 20 visible.

In a further embodiment of the pointer instrument shown in FIG. 3, a drive is provided for that pointer which is associated with the second instrument mechanism 14 by a drive shaft 32 which passes concentrically through the printed circuit board 15, the first instrument mechanism 12 and its drive shaft 34. The drive shaft 34 for the first instrument mechanism 12 for connection to the first pointer 16 is in the form of a hollow shaft which is once again located concentrically with respect to the pivoting axis. An embodiment such as this saves even more space than the embodiment which was shown in FIGS. 1 and 2. This further embodiment does not include the bracket which is required by the embodiments of FIGS. 1 nd 2. This allows the dial to be moved even closer to the plane of the printed circuit board 15, corresponding to a pointer instrument with only one pointer. Furthermore, owing to the lack of the bracket, a pointer instrument such as this is also, of course, smaller in the radial direction and only one concentric hole need be provided in the printed circuit board, while the circular cutout may be omitted.

The pointer illumination is provided by light-emitting diodes 51, 52 and optical fibers 49, 50 on the shafts see FIGS. 2 and 3. If necessary, the hollow shaft 34 in the FIG. 3 embodiment for connection of the first instrument mechanism 12 to the pointer 18 which is associated with it may have a correspondingly larger internal diameter for the optical fiber 49, 50 to pass through.

The above-described pointer instruments may be used in instrument panels in motor vehicles. In that application, there are particular advantages for the dial arrangement for the simultaneous arrangement of further pointer instruments with only one pointer on the printed circuit board 15. In addition to the application for instrument panels in motor vehicles, the illustrated pointer instrument may, of course, also be used in further fields of operation such as, for example in switch panels, in an aircraft cockpit, for test equipment, or else for nautical or similar purposes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pointer instrument, comprising:

a printed circuit board having an upper side and a lower side;

first and second instrument mechanisms independently arranged on said printed circuit board such that the printed circuit board is between the first and second instrument mechanisms; and first and second pointers having concentric pivoting axes, each of said first and second pointers comprising a radially extending element arranged above said upper side of said circuit board, wherein said first instrument mechanism acts on said first pointer and said second instrument mechanism acts on said second pointer, said first and second instrument mechanisms having essentially concentric rotational axes, wherein said second instrument mechanism is arranged below said printed circuit board with respect to said first and second pointers and said first instrument is arranged above said printed circuit board with respect to said first and second pointers, said second instrument mechanism comprising a bracket connecting said second instrument to said second pointer, said bracket projecting through a cutout in said printed circuit board, said cutout being arc-shaped and located essentially concentrically with respect to the pivoting axis of said second pointer.

2. The pointer instrument of claim 1, further comprising an optical fiber, wherein said bracket passes through said optical fiber.

3. The pointer instrument of claim 1, wherein said cutout through which said bracket projects defines a path which extends along an arc that is a maximum of 90°.

4. The pointer instrument of claim 1, wherein said second pointer comprises an area of said bracket which points radially inwards with respect to the pivoting axes of said first and second pointers and is above said printed circuit board.

5. The pointer instrument of claim 1, further comprising a hollow shaft element connecting said bracket to said second pointer, and a shaft connecting said first pointer to said first instrument mechanism, said shaft passing through said hollow shaft.

6. The pointer instrument of claim 1, wherein said bracket is a light guide element.

7. The pointer instrument of claim 1, further comprising a light guide element arranged on said bracket.

* * * * *